United States Patent [19]

Kommoss et al.

[11] Patent Number: 4,503,476
[45] Date of Patent: Mar. 5, 1985

[54] MAGNETIC TAPE-CASSETTE APPARATUS COMPRISING AT LEAST TWO PUSH-BUTTONS

[75] Inventors: Klaus Kommoss, Wetzlar-Naunheim; Valentin H. Schütte, Wetzlar, both of Fed. Rep. of Germany

[73] Assignee: U.S. Philips Corporation, New York, N.Y.

[21] Appl. No.: 551,502

[22] Filed: Nov. 14, 1983

Related U.S. Application Data

[63] Continuation of Ser. No. 312,479, Oct. 19, 1981, abandoned.

[30] Foreign Application Priority Data

Nov. 13, 1980 [DE] Fed. Rep. of Germany ....... 3042748

[51] Int. Cl.³ .............................................. G11B 15/00
[52] U.S. Cl. ....................................... 360/137; 360/90
[58] Field of Search ..................... 360/137, 96.5, 96.6, 360/96.4, 69, 90

[56] References Cited

U.S. PATENT DOCUMENTS

| | | | |
|---|---|---|---|
| 3,432,169 | 3/1969 | Schroder | 360/137 X |
| 3,882,542 | 5/1975 | Nakamichi | 360/96.5 X |
| 4,280,152 | 7/1981 | Silver | 360/137 X |
| 4,334,251 | 6/1982 | Sato | 360/96.6 |

Primary Examiner—John H. Wolff
Attorney, Agent, or Firm—David R. Treacy

[57] ABSTRACT

A magnetic tape-cassette apparatus having at least two push-button members, which perform different functions in the apparatus and a movable cassette compartment which is adapted to receive a cassette. An over-travel depression common to the two push-button members causes the cassette compartment to be pivoted by causing an ejection pin of the cassette compartment to follow profiles in portions of the push-button members. The profiles can be followed only in the ejection range when the two button portions are depressed simultaneously.

12 Claims, 1 Drawing Figure

U.S. Patent   Mar. 5, 1985   4,503,476
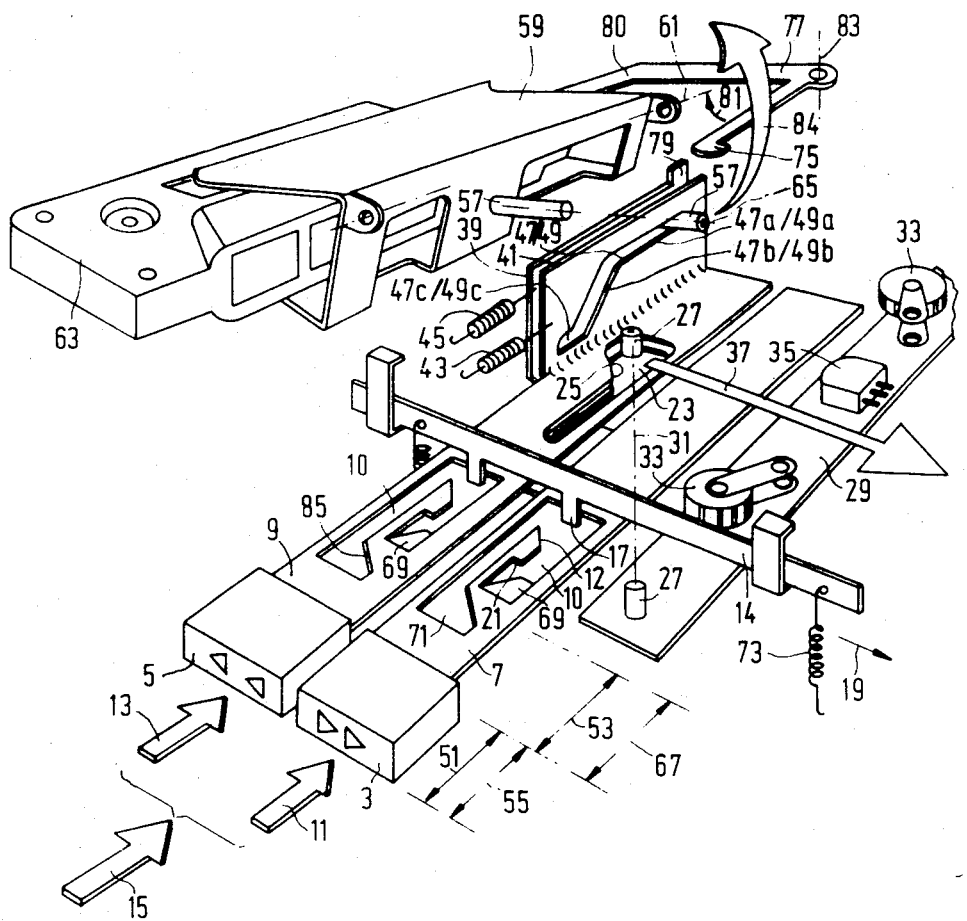

MAGNETIC TAPE-CASSETTE APPARATUS COMPRISING AT LEAST TWO PUSH-BUTTONS

This is a continuation of application Ser. No. 312,479, filed Oct. 19, 1981 now abandoned.

BACKGROUND OF THE INVENTION

The invention relates to a magnetic tape-cassette apparatus comprising at least two push-button members, which perform different functions within the apparatus and which can be latched, and a movable cassette compartment which is adapted to receive a cassette.

A magnetic tape-cassette apparatus of this type is generally known. Usually a push-button member is provided for each function. In addition, it is known that in radio equipment for example a third function is assigned to two buttons when these buttons are depressed concurrently.

U.S. Pat. No. 3,882,542 describes a push-button rod with a profiled portion which causes a cassette compartment to be tilted by engaging a pin. However, this simple construction demands the use of an additional button means.

SUMMARY OF THE INVENTION

It is an object of the invention to construct the push-button means in a magnetic tape-cassette apparatus of the type mentioned in the opening paragraph in such a way that the cassette compartment is opened when the two button members are depressed concurrently.

According to the invention, this object is achieved in a magnetic-tape-cassette apparatus in that each of the two push-button members is provided with a bracket portion,
the two bracket portions each have a profile,
the bracket portions, jointly control a guide element or follower pin of the cassette compartment via their profiles,
the profiles are identical and inclined at a location for moving the guide element, the inclined portions being engageable with the guide element only when the two push-button members are depressed concurrently.

This simple solution ensures that the cassette compartment remains closed when the buttons are depressed separately and is opened only when the two associated buttons are depressed concurrently.

In a further embodiment of the invention the profiled portion does not influence the guide element or follower pin by moving it along the path which extends in the direction of depression. This allows each individual button to be depressed and the guide element to move freely in the case of push-button movements along the profile portion which extends in the direction of depression. For this purpose the bracket portions are constituted by mutually spaced parallel plates.

If only one of the button portions is depressed it can be moved only over an actuating path length which corresponds to the length of the profile which extends in the direction of depression. However, if the two button portions are depressed concurrently, in accordance with a further embodiment of the invention, the inclined portion of the profile engages the guide pin upon movement along an extended or overtravel path, which extends beyond the normal travel actuating path for separate actuation of the button portions. In this extended path the guide element cooperates with the inclined portions of the two profiles and moves transversely with respect to the direction of depression. This thereby ensures that the cassette compartment is pivoted about a pivotal axis and thus becomes accessible in order to exchange a cassette.

In order to ensure that upon simultaneous depression of the button portions up to the extended path the cassette compartment is not only opened but is also kept open, one of the button members can be latched at the end of the extended path in accordance with a further embodiment. Since, owing to the inclined profile, the guide pin can return only when both button members are released, latching one of the button members at the same time locks the other button member.

BRIEF DESCRIPTION OF THE DRAWINGS

The invention will be described in more detail with reference to the sole FIGURE of drawing, which is a perspective diagrammatic view of an embodiment of the invention.

DESCRIPTION OF THE PREFERRED EMBODIMENT

The drawing illustrates the operation of two push-button members of a magnetic tape-cassette apparatus, which button members can be depressed together in order to open the cassette compartment. These push-button members, of which for example the push-button 3 may serve for the fast-winding function and the push-button 5 for the fast-rewinding function, are arranged with button portions on the front ends of the respective push-button members 7 and 9. Inside the apparatus the push-button members 7 and 9 can actuate certain switches and mechanical actuating elements which serve for fast winding and fast rewinding. Since these switches and actuating elements are irrelevant to the present invention, they are not shown and described in more detail. In the present context it is only of importance to ensure that separate depression, as indicated by the arrows 11 and 13, has no influence on the cassette compartment and concurrent depression, which is indicated by the arrow 15 causes the cassette compartment to open, so that an additional ejection may be dispensed with.

The push-button members 7 and 9 are formed with latching profiles 10, which are adapted to cooperate with a safety slide 14. The functions of the latching profiles to two push-button members 7 and 9 are the same. When, for example, the push-button bracket 7 is actuated via the push-button 3, an inclined portion 12 of the latching profile 10 moves a projection 17 of the safety slide 14 in the direction of an arrow 19. Upon depression the projection 17 then engages with a latching edge 21 of the latching profile. When the push-button bracket 7 is released and returns, the safety slide 14 moves in the direction of the arrow 19 and the relevant push-button springs back into its initial position.

In addition, the push-button members 9, 11 are provided with a head-slide profile 23. This head-slide profile 23 has an oblique surface 25, which is adapted to engage with a head-slide roller 27. The head-slide roller 27 is rigidly connected to a head mounting plate 29. For the sake of clarity the head-slide roller 27 is shown to comprise two portions, the portions being interconnected by an axial line 31. On the head mounting plate pivotal pressure rollers 33 are arranged, which rollers, in a manner not described, are engageable with the capstans. The head mounting plate carries an audio head 35.

In the depressed position of the push-button member 9, it not only engages the safety slide 13, but in addition the head-slide roller 27 presses the head mounting plate 29 together with the pressure rollers 33 away from the tape. This pressing away is effected with the aid of the oblique surface 25 by which the head-slide roller is urged away in the direction of an arrow 37.

At the back the push-button members 7 and 9 are provided with profile bracket portions 39 and 41. These bracket portions cooperate with tension springs 43 and 45, which are attached to the chassis and tend to return the push-button members 7 and 9 to their initial positions. The bracket portions 39 and 41 are perpendicular to the plane of the push-button members 7 and 9, extend parallel and adjacent to each other, and are spaced from each other. In the two bracket portions 39 and 41 ejection profiles 47/49 are formed, which are in register with each other when the two push-button members 7 and 9 are not shifted relative to each other; that is, when they are both in the initial position or are both depressed. Viewed from back to front, the ejection profiles 47 and 49 comprise a portion 47a/49a which extends in the direction of depression, an inclined portion 47b and 49b, and a short end portion 47c/49c which also extends in the direction of depression.

The lengths over which the push-button members 7, 9 can be depressed are represented by the arrows 51, 53. The arrow 51 indicates the length of the path over which each of the push-button members is individually depressible in order to obtain a fast forward or fast rewind function. The corresponding depression path may be referred to as the actuating path 55. This actuating path has a length, which corresponds to the length of the portion 47a/49a of the ejection profiles 47 and 49 which extends in the direction of depression. During such individual movements the bracket 39 or 41 can move to and fro freely with respect to an ejection pin 57 of a cassette compartment 59, the pin being free in the path 47a or 49a which extends in the direction depression.

The cassette compartment 59 is pivotable about an axis 61 and can receive a tape cassette 63, when the compartment is accessible for insertion. For the sake of convenience the ejection pin 57, which functions as a compartment guide element, is represented by two parts. The two parts are interconnected by an axial line 65.

In order to obtain ejection of the cassette 63 and thus a pivotal movement of the cassette compartment 59, the cassette compartment 59 should be pivoted about the axis 61, by engagement of the ejection pin 57 and the inclined portions 47b and 49b of the ejection profiles 47 and 49. In order to reach this ejection path, the two push-button members 7 and 9 are moved together in the direction of the arrow 53 into an extended path 57 beyond the actuating path 55. When entering this extended path 57 the ejection pin 57 engages the inclined portions 47b and 49b of the profiles 47 and 49. As a result of this, the cassette compartment 59 is pivoted about the axis 61. When passing through the extended path the projections 17 of the safety slide 14 engage with oblique surfaces 69 of the latching profiles 10 and slip over the surfaces of the members 7, 9 into latching notches 71. The safety slide 14 is lifted against biassing tension springs 73. At the end of the extended path 67 a latching hook 75 latches a push-button latch 77 behind a safety projection 79 of the bracket 39 which belongs to the push-button member 7. In this way the opened cassette compartment 59 is retained in the open position by means of the push-button latch 77. The two push-button members 7 and 9 cannot automatically return to the initial positions. This return is possible only when a new tape cassette 63 is inserted deep enough into the cassette compartment 59 and the push-button latch, via a sensing lever 80 arranged on this latch, pivots about the pivotal axis 83 in the direction of a narrow 81. Thus the projection 79 is released and the two push-button members 7 and 9 can return to the initial positions. Via the sliding surfaces 85 the safety slide 14 is then shifted slightly to the left for further switching purposes, until it reaches its initial position shown in the drawing. Similarly, the cassette compartment 59 is pivoted back into the playing position in the direction of the arrow 84 by means of ejection pin 57 which runs up, and via springs, not shown, the head-mounting plate 29 is urged back into the playing position as shown in the drawing.

What is claimed is:

1. A magnetic-tape-cassette apparatus comprising
   at least two push-button members, arranged to be movable within the apparatus to perform different functions,
and
   a movable cassette compartment arranged for receiving a cassette,
   characterized in that said compartment includes a guide element, and
   each of two said members comprises a bracket portion having a profile engaged by said guide element, said profiles being identical and each having an inclined portion arranged for moving said guide element, said brackets and profiles being arranged such that they jointly control said guide element and are engageable with the guide element to move it only when said two push-button members are depressed concurrently.

2. An apparatus as claimed in claim 1, characterized in that said guide element is movable in a direction transverse the direction of depression.

3. An apparatus as claimed in claim 2, characterized in that said bracket portions are constituted by mutually spaced parallel plates.

4. An apparatus as claimed in claim 1, characterized in that each member is movable along an actuating path upon separate actuation, and along an extended path upon concurrent depression, said inclined portions of the profiles engaging the guide element only upon movement of the members along the extended path.

5. An apparatus as claimed in claim 1, characterized by comprising means for latching one of said members at the end of the extended path, said profiles being so arranged that the other of said members is retained at the end of its entended path by latching of the one member.

6. An apparatus as claimed in claim 1, characterized in that said bracket portions are constituted by mutually spaced parallel plates.

7. A magnetic-tape cassette apparatus comprising at least two pushbuttons arranged to be individually depressible from an initial position over a given normal travel for controlling respective individual functions of the apparatus, two pushbutton members respectively connected to the pushbuttons and arranged to be movable from an initial position over said given travel in an actuating direction; a cassette compartment for receiving a cassette; means for ejecting a cassette from the compartment in response to simultaneous depression of said buttons; and means for individually latching a member, which has been moved said given travel, in a position in which a respective apparatus function is performed, characterized in that the apparatus further comprises means, including a movable element, for limiting travel of one member to a normal travel when only that one member is moved through said normal travel, means, responsive to movement of said at least two members along said normal travel, for permitting movement of said element in a direction transverse to movement of said members; and in response to movement in said transverse direction, for permitting movement of said at least two members together along an overtravel path greater than said normal travel, and further characterized in that said means for ejecting operates in response to movement of said members along said overtravel.

8. An apparatus as claimed in claim 7, characterized in that said means for limiting includes at least one guide profile, and said movable element is a follower pin arranged to engage said profile during a portion of the movement of said one member along the normal travel, and in that said follower pin and said profile each has a substantially linear movement during said normal travel and said overtravel.

9. An interlocked control mechanism for controlling a plurality of apparatus functions, comprising at least two members mounted for individual monement from an initial position over a normal travel in an actuating direction, for controlling respective individual apparatus functions in response to individual movement of a member; and means for individually latching a member, which has been moved said normal travel, in a position in which a respective apparatus function is performed, characterized in that the mechanism further comprises means, including a movable element, for limiting travel of a member to a normal travel when only that one member is moved through said normal travel, means, responsive to movement of said at least two members along said normal travel, for moving said element to a position in which said at least two members are movable together along an overtravel path greater than said normal travel, and means for performing an apparatus function in response to movement of said members along said overtravel.

10. A mechanism as claimed in claim 9, characterized in that said means for limiting includes at least one guide profile, and said movable element is a follower pin arranged to engage said profile during a portion of the movement of said one member along the normal travel.

11. A mechanism as claimed in claim 10, characterized in that said follower pin and said profile each have a substantially linear movement during said normal travel and said overtravel.

12. A mechanism as claimed in claim 11, characterized in that said at least two members have a respective guide profile having a same configuration, said guide profiles being aligned when said members are in said initial position; and a single follower pin engages one portion of the profile of said one member during normal travel of said member, and also engages a different portion of the profile of another member at the end of the normal travel.

* * * * *